United States Patent
Ziegler

Patent Number: 6,145,026
Date of Patent: Nov. 7, 2000

[54] PARAMETERIZING AN I/O INTERFACE FOR SUBSTANTIALLY WRITING UNLIMITED DATA INTO A BUFFER AND DIRECTLY WRITING A DETERMINED AMOUNT OF SAID DATA INTO A COMPUTER MAIN MEMORY

[75] Inventor: Helmut Ziegler, Bubenreuth, Germany

[73] Assignee: Siemens Aktiengesellschaft, Munich, Germany

[21] Appl. No.: 09/019,130

[22] Filed: Feb. 5, 1998

[30] Foreign Application Priority Data

Feb. 5, 1997 [DE] Germany .............................. 197 04 336

[51] Int. Cl.[7] ...................................................... G06F 13/14
[52] U.S. Cl. ................................. 710/22; 711/113; 712/1; 345/115
[58] Field of Search ................................. 710/21, 22, 52, 710/55; 711/113; 712/1; 345/115

[56] References Cited

U.S. PATENT DOCUMENTS

| | | | |
|---|---|---|---|
| 4,860,193 | 8/1989 | Bentley et al. | 710/55 |
| 4,931,924 | 6/1990 | Kageura | 710/55 |
| 5,319,786 | 6/1994 | Yamamura | 345/115 |
| 5,539,915 | 7/1996 | Burton et al. | 710/21 |
| 5,696,991 | 12/1997 | Chang | 710/52 |
| 5,761,520 | 6/1998 | Mase et al. | 712/1 |
| 5,778,420 | 7/1998 | Shitara et al. | 711/113 |

FOREIGN PATENT DOCUMENTS

| | | |
|---|---|---|
| 41 21 863 | 1/1993 | Germany . |
| 42 31 580 | 3/1994 | Germany . |

*Primary Examiner*—Thomas C. Lee
*Assistant Examiner*—Abdelmoniem Elamn
*Attorney, Agent, or Firm*—Hill & Simpson

[57] ABSTRACT

In a method and apparatus for data acquisition, parameterization of an interface is undertaken such that a substantially unlimited data stream is written into a buffer memory via an I/O interface, and such that at least one block of the data written into the buffer memory is written directly into a main memory of a processing computer via a DMA interface. The DMA quantity of the at least one data block written directly into the main memory is determined dependent on the data stream incoming at the I/O interface. As a result, both a continuous data stream with high data rate, as well as a small dataset of predetermined size, within a measurement can be read into the processing computer, respectively in real time.

13 Claims, 1 Drawing Sheet

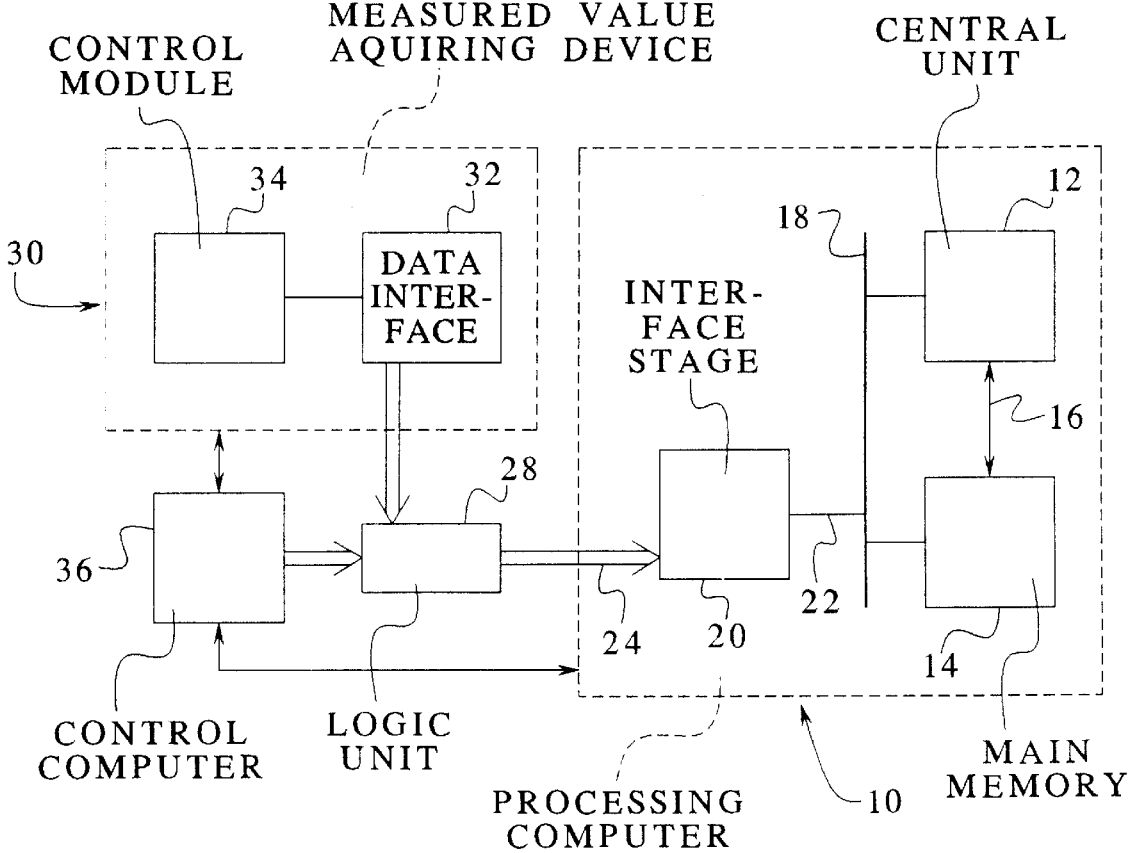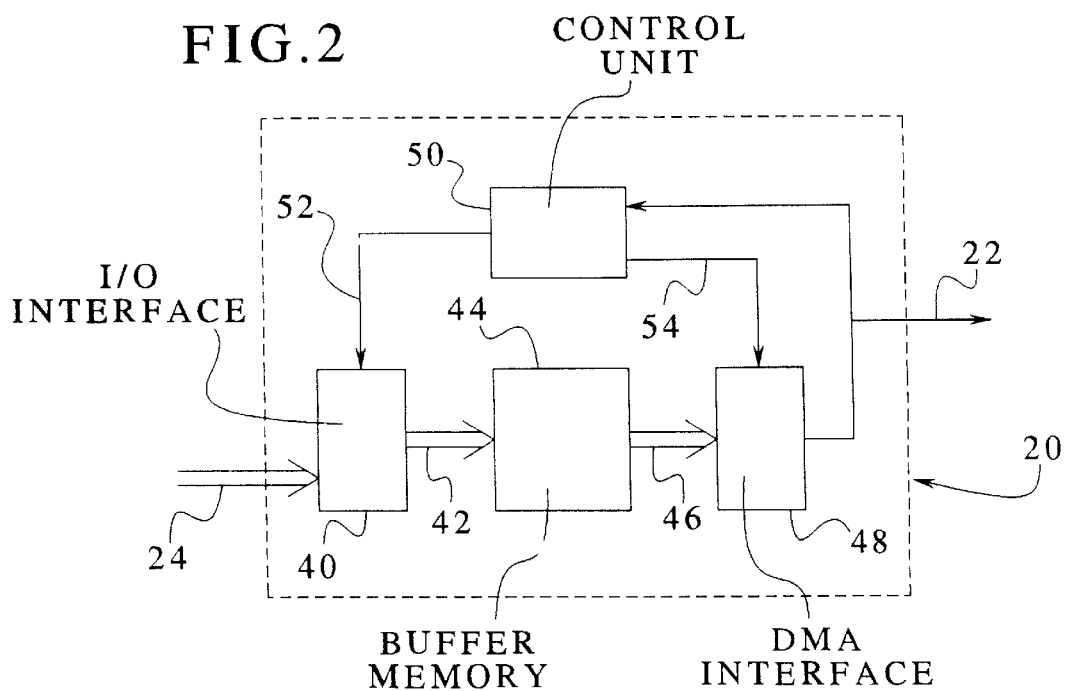

PARAMETERIZING AN I/O INTERFACE FOR SUBSTANTIALLY WRITING UNLIMITED DATA INTO A BUFFER AND DIRECTLY WRITING A DETERMINED AMOUNT OF SAID DATA INTO A COMPUTER MAIN MEMORY

BACKGROUND OF THE INVENTION

1. Field of the Invention

The present invention is directed to a method and an apparatus for data acquisition, particularly for the acquisition of measured data in real time.

2. Description of the Prior Art

Large datasets arise in certain measuring procedures in devices that acquire measured data. Such devices include, for example, image-generating medical devices such as a tomography apparatus, an angiography apparatus. These devices offer the data with a predetermined, usually extremely high, data rate and the data must be forwarded to a processing computer in real time or nearly in real time. If excessively great delays occur in the acceptance of the data by the processing computer, then data are lost because the ongoing measuring procedure cannot be arrested. The measurement must then be repeated.

German OS 42 31 580 discloses a method and an apparatus wherein a continuous data flow generated by a data source is written into a data buffer memory. A driver module, on an operating system level of a data processing system, controls a DMA transfer of data from the data buffer memory into an input/output memory. Each DMA transfer fills an elementary buffer of the input/output memory. Data acquisition rates of more than 600 kBytes per second are possible with this method.

A problem associated with the method disclosed in German OS 42 31 580 is that the DMA transfer has a permanently prescribed length and the data that are read in can only be further-processed after the termination of the DMA transfer. In some measuring procedures, however, it is desirable to immediately interpret shorter data blocks. For example, artefacts that are caused by the movement of the rib cage during respiration can occur in nuclear magnetic tomographic measurements of the heart of a patient. In order to find a point in time of optimum rest of the rib cage for the actual measurement, a number of short measurements perpendicular to the plane of the diaphragm are implemented first. Relatively few data, which must be immediately interpreted, arise in these short measurements. The actual measurement, wherein large datasets arise and must be transmitted, is initiated as soon as a predetermined position of the rib cage is recognized on the basis of the interpretation of the short measurements.

SUMMARY OF THE INVENTION

An object of the present invention is to provide a method and an apparatus for data acquisition with which both a steady data stream with high data rate and a small dataset having a predetermined size can be read into a processing computer, respectively in real time.

The above object is achieved in accordance with the principles of the present invention in a method and an apparatus for the acquisition of measured data in real time, wherein an interface stage between a data source and a data processor is parameterized so that a substantially unlimited data stream is written into a buffer memory of the interface stage via an I/O interface, wherein the interface stage is further parameterized so that at least one block of the data written into the buffer memory is written directly into a main memory of the data processor via a DMA interface, and wherein a DMA quantity of the aforementioned at least one data block which has been written into the main memory is determined dependent on the data stream which is incoming at the I/O interface.

The invention is based on defining the size of the at least one data block transmitted via the DMA interface (DMA direct memory access) dependent on the properties of the data stream set at the I/O interface. This quantity is referred to herein as a "DMA quantity". Given the acquisition of measured data, for example, it is possible to immediately process the results of short measurements wherein few data arise as well as to reliably register the large datasets required for extensive measurements.

The inventive solution of defining the DMA quantity dependent on the incoming data stream enables a fast switching between the operating modes. The extensive measurement can thus begin at any time. Further, this solution assures the synchronization of the data to be transmitted with the switching information. The suitable DMA quantity can thus be exactly set at the correct point in time (namely, given a change of the measuring mode).

It is inventively provided that the interface is fashioned and parameterized so that it is capable of reading in a substantially unlimited data stream, rather than only a data block having a prescribed length. Continuous data streams with high data rates can also be read in as a result of this parameterization. The term "a substantially unlimited data stream" means a data stream that is either unrestricted in length or that exhibits a maximum length that is so large that it is not reached in practical operation. Such a maximum length is preferably far greater that the memory space available in the buffer memory of the interface, In preferred embodiments, the DMA quantity is defined dependent on a clock rate and/or transmission rate of the incoming data stream and/or dependent on information contained in this data stream. For example, such information can be a data word or a number of data words, particularly data words at the head of the incoming data stream.

The data stream can be completely generated by a device that generates measured values. In preferred embodiments, however, it is provided that the device that generates measured values only offers the actual measured data, and that a control computer is employed both to set the measuring mode of the device that generates measured values and to insert the information relating to the DMA quantity into the measured data stream, or to place this information in front of the measured data stream. A suitable logic circuit can be provided for this insertion of the control information into the measured data stream.

A driver that reads the information with respect to the DMA quantity out of the buffer memory and correspondingly parameterizes the DMA procedure is preferably provided on the operating system level in a processing computer.

In alternative embodiments, the apparatus according to the invention is arranged on an interface card that is plugged into the processing computer. As an alternative, the processing computer can also be integrated in the apparatus. The data transmission from the buffer memory into the main memory preferably ensues via a PCI bus (PCI=peripheral component interconnect). In particular, a standard work place computer (PC or work station) operated by Windows NT or UNIX is provided as processing computer. Such computers are widely available and economic. Since these operating systems are not real-time operating systems, it is particularly important that the interface be capable of accepting a continuous measured data stream even without continuous parameterization.

In preferred embodiments, the interface only has to be parameterized a single time at the start of a measurement in view of the read-in of the measured data into the buffer memory. This, however, does not preclude the central unit of the processing computer from also modifying the parameterization controlling the read-in of the measured data during the measuring event as well. Preferably, the filling degree of the buffer memory on the interface card can be determined by the control means and/or the central unit. The DMA data transmissions from the buffer memory to the main memory are preferably likewise controlled and repeatedly parameterized by a driver program implemented by the processing computer. To that end, the central unit preferably hands over the length of every data block to be transferred into the main memory and the start address thereof in the main memory to the control means or to the DMA interface of the interface stage.

In a preferred embodiment, the frequency of the DMA accesses, as well as the size of the buffer memory, are adapted with an adequate safety margin to the highest data rate offered by the measuring device. As a result, no measured data are lost, even taking the delays possible given Windows NT or UNIX into consideration. If a transmission error were to occur as an exception, this is recognized and the measurement is repeated.

Preferably, a path is also provided for the transmission of control data from the processing computer to the measuring apparatus. This path can be a direct connection or proceed via the DMA interface and the I/O interface or via the control computer. A data rate that is significantly lower than that for the measured data suffices for the control data.

DESCRIPTION OF THE DRAWINGS

FIG. 1 is a block circuit diagram of an inventive system for data acquisition.

FIG. 2 is a block circuit diagram of the inventive interface.

DESCRIPTION OF THE PREFERRED EMBODIMENTS

FIG. 1 shows a processing computer 10 that is fashioned as PC or work station and operates using Windows NT or UNIX. In addition to a number of components that are not shown, the processing computer 10 has a central unit 12 that is capable of exchanging data with a main memory 14 via an internal bus 16. The central unit 12 and the main memory 14, further, are connected to an expansion bus fashioned as a PCI bus that offers a number of plugin locations. An interface stage 20 fashioned as interface card is plugged into one of these plugin locations and is electrically connected to the expansion bus 18 via a bus terminal 22. The interface stage 20 has a data input 24 that is fashioned for data transmission via a light waveguide.

The data input 24 is connected to an output of a logic unit 28. In the exemplary embodiment explained herein, the measured value-acquiring device 30 is fashioned as a medical tomography apparatus. It has a number of components, but only a data interface 32 and a control module 34 connected thereto are shown in FIG. 1. The data interface 32 sends the measured data determined by the apparatus 30 to a first input of the logic unit 28. The control module executes a plurality of control and administration tasks in the apparatus 30.

A second input of the logic unit 28 is connected to a control computer 36. The control computer 36 is in turn connected via respective bidirectional lines to the processing computer 10 and the measured value-acquiring apparatus 30. Via these lines, the control computer 36 receives evaluation information from the processing computer 10 and controls the measuring experiment implemented by the measured value-acquiring apparatus 30.

FIG. 2 shows the internal structure of the interface stage 20. The data input 24 is connected to an I/O interface 40 that is in turn capable of writing the measured data into a buffer memory 44 via a data line 42. The buffer memory 44 is organized as a FIFO memory (FIFO=first in first out). The data can be read out from the buffer memory 44 by a DMA interface 48 via a further data line 46. Via the bus terminal 22 to which it is connected, the DMA interface 48 is capable of implementing a direct memory access to the main memory 14.

A control unit 50 is in communication with the bus terminal 22 and, via lines 52 and 54, is also in communication with the I/O interface 40, or the DMA interface 48. The control unit 50 contains a number of parameter and control registers, particularly registers that indicate the beginning and the end of the data contained in the buffer memory 44. All operations on the interface card 20 are controlled and monitored by the control unit 50. Among other things, the control unit 50 monitors the buffer memory 44 for overflow. The central unit 12 parameterizes the control 50 via the bus terminal 22 and is capable of interrogating operating parameters, particularly the degree of filling of the buffer memory 44.

During operation of the inventive apparatus, the central unit 12 controlled by a driver program first parameterizes the control unit 50 such that the I/O interface 40 is ready to receive an unlimited data stream. Subsequently, the I/O interface 40 independently accepts all data arriving at the data input 24 and writes them into the buffer memory 44. A known protocol with a hardware handshake that allows high data rates is thereby utilized. The central unit 12 is thus significantly relieved.

A measuring episode is now initiated by an input from the user. As an example, it is assumed that a sequence of short measurements should ensue first in the measuring episode. A detailed measurement with high data rate is to be implemented when a predetermined condition is recognized on the basis of the short measurements. The input of the user is communicated from the processing computer 10 to the control computer 36 that in turn drives the measured value-acquiring apparatus 30. The control computer 36 thus initiates the implementation of a short measurement and outputs a data word to the logic unit 28 that identifies a short DMA quantity (for example, 1 Kbyte). This data word can be the DMA quantity expressed in bytes. In the exemplary embodiment described herein, the DMA quantity is identical to the quantity of measured data generated by a short measurement, whereas the DMA quantity is smaller in alternative embodiments (in particular, a fraction of the measured dataset).

The logic unit 28 hands over the first data word derived from the control computer 36 to the interface unit 20 and subsequently likewise forwards all data incoming from the measured value-acquiring apparatus 30 to the data input 24. The central unit 12 controlled by the driver software first reads this data word individually from the buffer memory 44 and then correspondingly parameterizes the control unit 50. The incoming measured data are now transmitted into the main memory with the set DMA quantity of 1 Kbyte and are immediately interpreted by the processing computer 10.

The beginning of the detailed measurement with high data rate is triggered either by an input of the user or automatically dependent on the result of the data evaluation in the processing computer 10. In response, the processing computer 10 forwards a corresponding instruction to the control computer 36 that in turn drives the measure value-acquiring apparatus 30. Further, the control computer 36 forwards a data word that identifies a large DMA quantity (about 100 KBytes up to a few MBytes) to the logic unit 28, this data word proceeding from the latter to the data input 24. The fast data stream (up to 32 MBytes/s) now generated by the apparatus 30 is likewise forwarded to the interface means 20 from the logic unit 28.

The central unit 12 in turn initially reads the first incoming data word and correspondingly sets the DMA quantity. As a result, DMA operations are periodically implemented with the set quantity. To that end, the central unit 12 controlled by the driver program gives the control unit 50 and the DMA interface 48 a DMA command that contains the size of the data block to be transmitted as well as the starting address thereof in the main memory 14 (more precisely, in a section of the main memory 14 organized as FIFO memory). This block is now written directly (direct memory access) into the main memory 14 by the DMA interface 48 via the bus terminal 22 and the PCI expansion bus 18. In this operating mode, continuous data rates of 24 MBytes/s and peak data rates of 32 MBytes/s are possible given little hardware outlay.

The invention is employable in all applications wherein high data rates can occur but evaluations must also take place (punctually) in between. This is particularly true when the evaluations influence the progress of the measuring experiment. i.e. if the measuring experiment could not be implemented without the fast interpretation of specific data.

In further alternative embodiments, the selection of the data rate ensues with an external decision means or ensues automatically by the device that generates the measured data.

Although various minor modifications might be suggested by those skilled in the art, it should be understood that I wish to embody within the scope of the patent warranted hereon all such modifications as reasonably and properly come with the scope of my contribution to the art.

I claim as my invention:

1. A method for acquiring measured data in real time, comprising the steps of:
   acquiring a stream of measured data and supplying said measured data stream to a processing computer via an interface stage, said interface stage containing a buffer memory, an I/O interface which receives said measured data in said data stream as incoming data, containing information, at a rate selected from the group consisting of a transmission rate and a clock rate, and a DMA interface;
   parameterizing said interface stage for allowing a substantially unlimited stream of said incoming data to be written into said buffer memory via said I/O interface;
   parameterizing said interface stage for directly writing a block of said incoming data written into said buffer memory into a main memory of said processing computer as a data block via said DMA interface, said data block having a DMA quantity associated therewith representing a size of said data block; and
   determining said DMA quantity of said at least one data block dependent on at lest one of said rate and said information of said incoming data at said I/O interface.

2. A method as claimed in claim 1 wherein the step of determining said DMA quantity comprises determining said DMA quantity dependent on at least one data word of said incoming data at said I/O interface.

3. A method as claimed in claim 1 wherein the step of determining said DMA quantity comprises determining said DMA quantity dependent on a first data word of said incoming data at said I/O interface.

4. A method as claimed in claim 3 comprising the additional steps of supplying said data stream to a logic unit preceding said I/O interface and, in said logic unit, appending said first data word indicating said DMA quantity to a beginning of said data stream to produce said incoming data to said I/O interface.

5. A method as claimed in claim 4 comprising the additional step of reading out said first data word from said buffer memory for determining said DMA quantity.

6. A method as claimed in claim 1 wherein the step of determining said DMA quantity comprises determining said DMA quantity dependent on a plurality of leading data words of said incoming data at said I/O interface.

7. A method as claimed in claim 6 comprising the additional steps of supplying said data stream to a logic unit preceding said I/O interface and, in said logic unit, appending plurality of leading data words indicating said DMA quantity to a beginning of said supplied to said I/O interface as incoming data.

8. A method as claimed in claim 4 comprising the additional step of reading out plurality of leading data words from said buffer memory for determining said DMA quantity.

9. An interface stage connected between a source of measured data which produces a data stream, and a processing computer having a main memory, said interface stage comprising:
   an I/O interface to which incoming data, containing information corresponding to said data stream, are supplied at a rate selected from the group consisting of a transmission rate and a clock rate;
   a buffer memory parameterized for receiving a substantially unlimited stream of said incoming from said I/O interface;
   a DMA interface in communication with said main memory of said processing computer for writing a block of said incoming data written into said buffer memory, directly into said main memory as a data block, said data block having a DMA quantity associated therewith representing a size of said data block; and
   control means for determining the DMA quantity of said data block dependent on at least one of the rate and information of said incoming data at said I/O interface.

10. An interface stage as claimed in claim 9 wherein said DMA interface comprises means for implementing direct memory access to said main memory of said processing computer via an expansion bus.

11. An interface stage as claimed in claim 10 wherein said expansion bus comprises a PCI bus.

12. An interface stage as claimed in claim 10 further comprising logic means, preceding said I/O interface, for appending at least one data word indicating the DMA quantity to said data stream to produce said incoming data supplied to said I/O interface.

13. An interface stage as claimed in claim 12 further comprising a control computer, connected to said logic means, for supplying information indicating said DMA quantity to said logic means for inclusion in said at least one data word.

* * * * *